United States Patent [19]
DiBella

[11] Patent Number: 5,904,840
[45] Date of Patent: May 18, 1999

[54] APPARATUS FOR ACCURATE CENTRIFUGAL SEPARATION OF MISCIBLE AND IMMISCIBLE MEDIA

[76] Inventor: Alberto DiBella, 720 S. Deerfield Ave., Suite 4-5, Deerfield Beach, Fla. 33441

[21] Appl. No.: 09/055,242

[22] Filed: Apr. 6, 1998

[51] Int. Cl.$^6$ .................. B01D 17/12; B01D 17/038; B04B 9/10; B04B 11/04

[52] U.S. Cl. .................. 210/85; 210/94; 210/96.1; 210/143; 210/512.1; 494/1; 494/7; 494/10; 494/23

[58] Field of Search .................. 210/85, 94, 96.1, 210/512.1, 512.3, 739, 745, 787, 789, 923; 356/308, 440; 494/1, 5, 7, 10, 27, 53, 23

[56] References Cited

U.S. PATENT DOCUMENTS

| | | | |
|---|---|---|---|
| 3,743,102 | 7/1973 | Mensing et al. | 210/512.1 |
| 4,369,915 | 1/1983 | Oberg et al. | 494/53 |
| 5,044,755 | 9/1991 | Landa et al. | 356/440 |
| 5,084,189 | 1/1992 | Richter | 210/789 |
| 5,156,751 | 10/1992 | Miller | 494/53 |
| 5,484,521 | 1/1996 | Kramer | 210/96.1 |
| 5,489,980 | 2/1996 | Anthony | 356/308 |

Primary Examiner—Joseph W. Drodge
Attorney, Agent, or Firm—Oltman, Flynn & Kubler

[57] ABSTRACT

A system for separating flowable media into its components includes a pump delivering a flowing stream of the media, a separation tube through which the stream of the flowable media is passed, a mechanism for spinning the stream of flowable media about the axis of the separation tube at sufficient rotational speed that centrifugal force within the stream causes the media components to separate into component radial layers, according to their specific gravities, an extraction conduit for selectively extracting one or more of the radial layers from the separation tube, and monitoring and automatic feed back elements for measuring the component content as the media enters and exits the separation tube and for adjusting the rotational speed of the media. The monitoring and automatic feed back elements preferably include at least one probe extending into the composite media for gathering data concerning the content of the composite media, and an analyzer connected to the at least one probe for receiving analyzing data and for automatically controlling the rotational speed imparted to the media by the rotation mechanism. The analyzer preferably includes a computer.

8 Claims, 8 Drawing Sheets

APPARATUS FOR ACCURATE CENTRIFUGAL SEPARATION OF MISCIBLE AND IMMISCIBLE MEDIA

BACKGROUND OF THE INVENTION

1. Field of the Invention

The present invention relates generally to the field of environmental protection and oil spill clean up devices. More specifically the present invention relates to a system for separating flowable media into its component media. The system includes pump means delivering a continuously flowing column of the media from a media source, a separation tube through which a column of the flowing media is continuously passed, means for spinning the column about the axis of the tube at sufficient speed that centrifugal force within the column causes the component media to separate into radial layers, extraction conduit means for selectively extracting one or more of the radial layers from the tube, bleeder means for introducing a fluid such as air into the tube to alter the diameter of the radial layers, and monitoring and automatic feed back means for measuring the component medium content as the media enters and exits the separation tube and for adjusting the rotational speed of the media and the rate of fluid introduction from the bleeder means. An alternative to the bleeder means is provided in the form of a mechanism for altering the diameter of the extraction conduit means.

2. Description of the Prior Art

Millions of gallons of precious fuel are discharged into the sea by ocean liners and barges each year. This fuel has a profound environmental and economic impact on the coastal fishing grounds where it eventually ends up on the beaches and sea shore. In order to quickly recapture and store the lost fuel, the fuel must be pumped from the sea surface and separated from the water.

U.S. Pat. No. 5,084,189, issued on Jan. 12, 1992 to Richter, discloses a method and apparatus for separating fluids having different specific gravities. Richter teaches a mechanism for axially spinning an advancing column of flowable media within a separation tube so that at least one component medium of the composite media is separated by centrifugal force into a series of radial layers according to its specific gravity. One or more individual layers are then selectively drained from the column. The innermost, or central layer is preferably drained through an axially mounted conduit within the separation tube. Solid debris is also preferably drawn out through a second conduit mounted within the separation tube adjacent the tube wall. While Richter is highly effective and efficient for such media separation, it lacks provision for altering the diameter of the layers to more exclusively extract the selected layer and lacks provision for gathering separation data as feed back, and for generating and adjusting rotational speed and layer diameter for optimum results through automatic control.

It is thus an object of the present invention to provide such a flowable media separation system which separates media consisting of one or more fluids and contaminants of different specific gravities and densities by centrifugal action, such that the lighter fluids are forced by free vortex action and by Bernoulli pressure forces into tight and separate cylindrical layers about the central axis of the spinning media and such that the spinning media is transported axially from an entry point to an exit point.

It is another object of the present invention to provide such a system in which at least one layer is selectively removed through an extraction conduit opening into the selected layer.

It is still another object of the present invention to provide such a system which includes means for introducing a fluid such as air into the spinning media to form a center column of adjustable diameter within the media column, to in turn adjust the diameters of the layers to closely match the diameter of an extraction conduit to approach exclusive extraction of the selected constituent, the air stream serving to modify the density of the centrally separated fluid stream and thus minimize the loss of the higher density fluids to the central stream.

It is still another object of the present invention to provide such a system which provides sensor probe and automatic feed back means to monitor the incoming and outgoing media for constituent content, and specifically to monitor the concentration of contaminants in both the contaminant extraction conduit and the fluid extraction conduit, and to monitor the amount of unseparated fluid within the different radial positions.

It is finally an object of the present invention to provide such a system which computes a feed back signal from the data gathered through the monitoring in order to correctly determine and control the rotational speed of the rotation means and thus achieve maximum separation results, to monitor the amount of unseparated fluids and to compute a feed back signal in order to control a bleed valve and thus modify the density of the media by injecting of air into the media before the separation.

SUMMARY OF THE INVENTION

The present invention accomplishes the above-stated objectives, as well as others, as may be determined by a fair reading and interpretation of the entire specification.

A system is provided for separating flowable media into its components, including a pump delivering a flowing stream of the media, a separation tube through which the stream of the flowable media is passed, a mechanism for spinning the stream of flowable media about the axis of the separation tube at sufficient rotational speed that centrifugal force within the stream causes the media components to separate into component radial layers, according to their specific gravities, an extraction conduit for selectively extracting one or more of the radial layers from the separation tube, and monitoring and automatic feed back elements for measuring the component content as the media enters and exits the separation tube and for adjusting the rotational speed of the media.

The system preferably additionally includes a bleeder mechanism for introducing a fluid into the separation tube to alter the diameter of the component radial layers, where the media monitoring and automatic feed back mechanism additionally adjusts the rate of fluid introduction from the bleeder mechanism. Where the extraction conduit has an inner diameter, the system preferably additionally includes an extraction port adjustment mechanism for altering the inner diameter of the extraction conduit.

The monitoring and automatic feed back elements preferably include at least one probe extending into the composite media for gathering data concerning the content of the composite media, and an analyzer connected to the at least one probe for receiving analyzing data and for automatically controlling the rotational speed imparted to the media by the rotation mechanism. The separation tube has a tube inlet end and a tube exit end, and the probe preferably includes a first probe at the tube inlet end and a second probe at the tube outlet end. The probes each preferably include a spectrometer for measuring the spectral response of the composite media. The analyzer preferably includes a computer.

A system is further provided for separating flowable composite media into its components, including a pump delivering a flowing stream of the composite media, a separation tube through which a column of the flowable composite media is passed, a mechanism for spinning the stream of flowable composite media about the axis of the separation tube at sufficient rotational speed that centrifugal force within the column causes the components to separate into component radial layers, according to their specific gravities, an extraction conduit for selectively extracting one or more of the radial layers from the separation tube, and a bleeder mechanism for introducing a fluid into the tube to alter the diameter of the component radial layers.

The system preferably additionally includes media monitoring and automatic feed back elements for measuring the component content as the media enters and exits the separation tube and for adjusting the rotational speed of the media and the rate of fluid introduction from the bleeder mechanism.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–8, a fluid separation system 10 is disclosed for separating flowable composite media 12 into individual component media 16. System 10 includes pump means 20 delivering a continuously flowing column of the media 12 from a media source (not shown), a separation tube 30 through which a column or stream of the flowing media 12 is continuously passed, rotation means 40 with rotation blades 42 for spinning the stream about the axis of separation tube 30 at sufficient speed that centrifugal force within the stream causes the media 12 components 16 to separate into radial layers 14, extraction conduit means 60 for selectively extracting one or more of the radial layers 14 from separation tube 30, bleeder means 70 for introducing a fluid such as air into tube 30 to alter the diameter of the radial layers 14, and monitoring and automatic feed back means 80 for measuring the component 16 content as the media 12 enters and exits separation tube 30 and for adjusting the rotational speed of the media 12 and the rate of fluid introduction from bleeder means 70. An alternative to bleeder means 70 is provided in the form of a port adjustment mechanism 80 for altering the inner diameter of the extraction conduit means 60.

Figure 1:
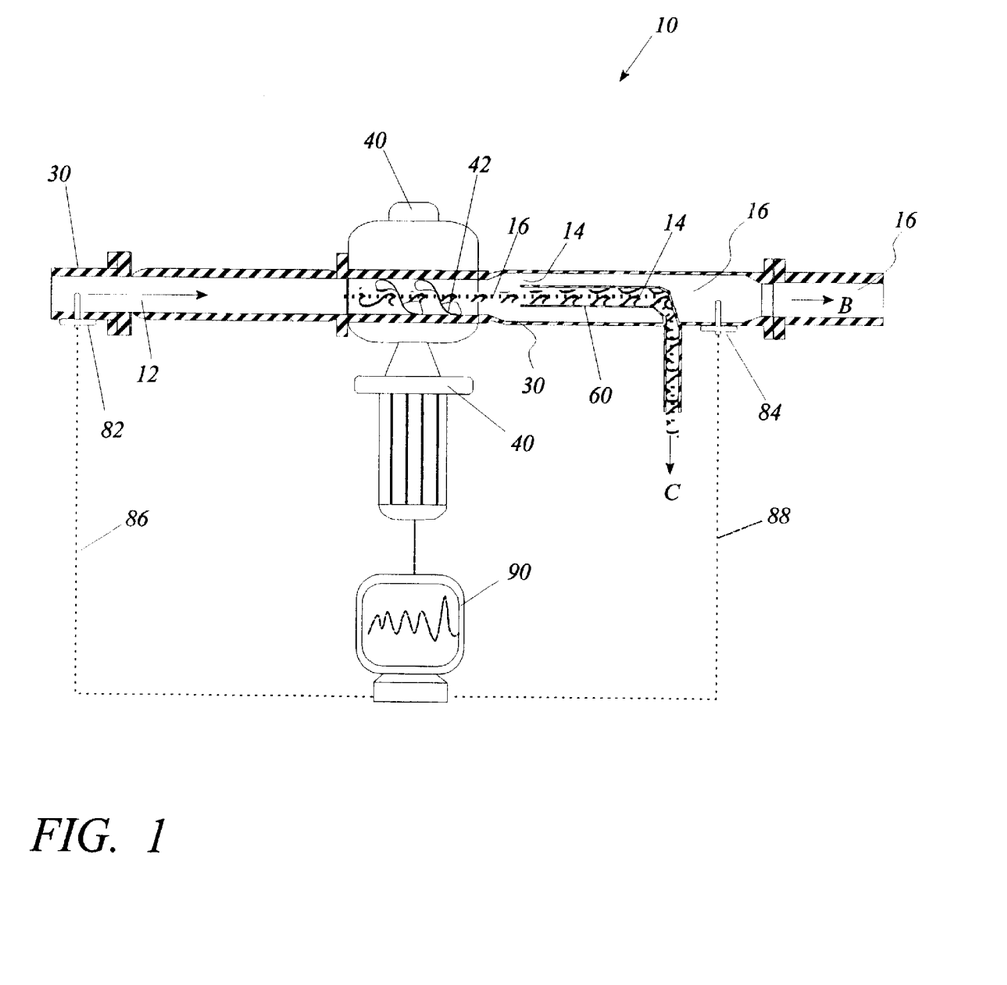
FIG. 1 is a top view of the basic system with the separation tube shown in cross-section, showing the separator speed control system and the analyzer.
Figure 2:
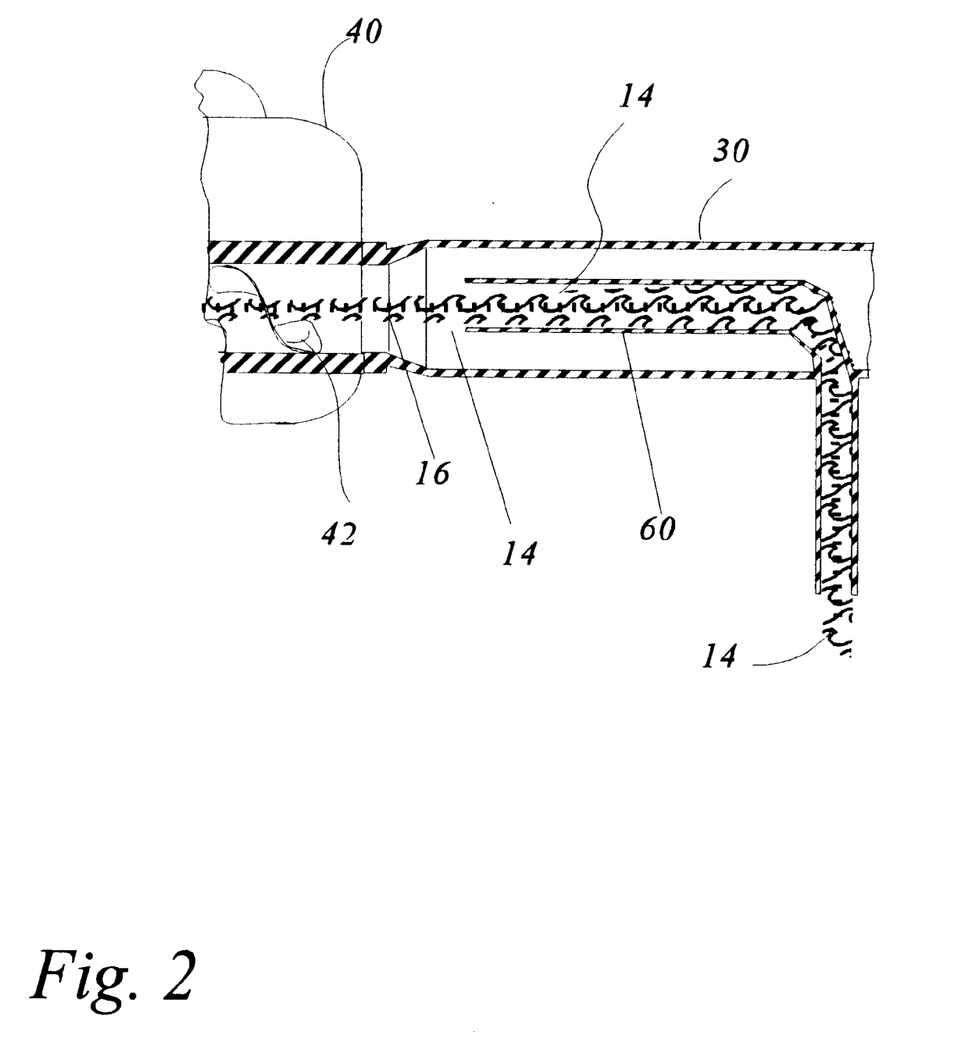
FIG. 2 is blow-up of the discharge end of the separation tube of FIG. 1, where the media exiting the separator is separated into three or more streams of component media fluids, with the air and lighter medium fluids entering an axially positioned extraction conduit.
Figure 3:
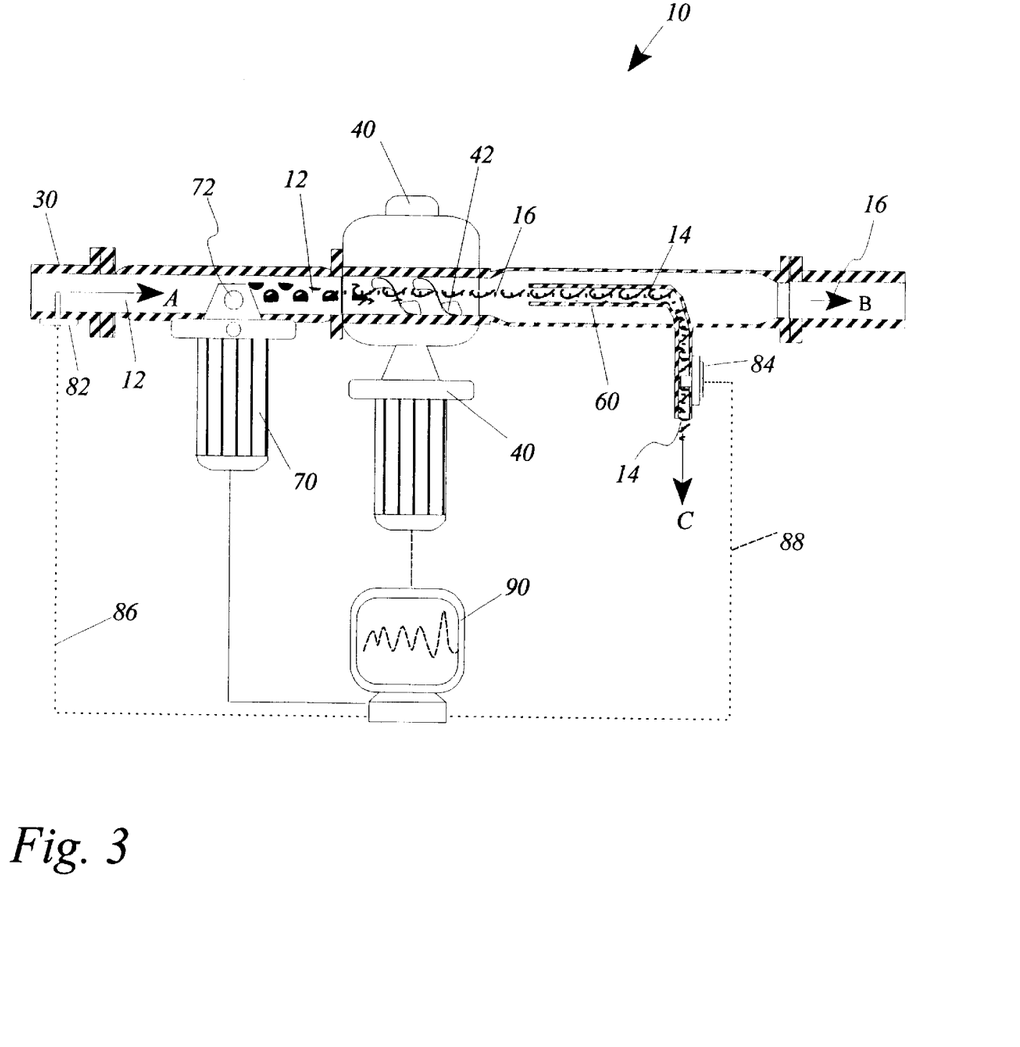
FIG. 3 is a view of the system as in FIG. 1, with a motorized air bleed valve added.

The specifications of the pump means 20, separator tube 30, rotation means 40 and extraction conduit means 60 are described in U.S. Pat. No. 5,084,189 issued on Jan. 12, 1992 to Richter, owned by the present applicant. The disclosure of Richter is incorporated by reference into this specification. Two key features added to the Richter system for the present invention are the monitoring and automatic feed back means 80 and the bleeder means 70. Analyzer 90 receives feed back signals from probes 82 and 84 and uses this data to alter the media 12 rotational speed and the rate of fluid injection by bleeder means 70, if any, to optimize separation.

Monitoring and Automatic Feed Back Means

The present monitoring and automatic feed back means 80 generally includes an intake probe 82 and an exit probe 84 for detecting and measuring the quantities of component media 16 in composite media 12, an analyzer 90 in the form of a suitably programmed computer, connected to the probes 82 and 84 and to rotation means 40 and bleeder means 70.

Media intake probe 82 is optionally a fiber optic probe for measuring the spectral response of the fluid media 12 entering separation tube 30 so that the concentration of each component medium 16 can be computed. Probe 82 is preferably that described in U.S. Pat. No. 5,044,755 issued on Aug. 3, 1991 to Anthony, et al., which is herein incorporated as part of this disclosure and specification. Probe 82 receives light from a spectrophotometer such as described in U.S. Pat. No. 5,489,980, issued to Anthony. Analyzer 90 may be provided, for example, which includes a spectrophotometer generating a beam of white light of broad spectral range. In this instance, the light is transported through bi-directional fiber optic cables 86 and 88 and passed through probe 82 which then exposes the light through media 12. Upon exposure to the media 12, some of the light is absorbed by the media 12. Thus each component molecule of media 12 absorbs a particular wavelength of light. Probe 82 has a reflective surface which permits the attenuated light passing through media 12 to be reflected back to fiber optic cable 86 and transported back to the analyzer 90. The light is then separated into its spectral components and analyzed to determine which compounds and at what concentration they are present in the media 12. Alternatively, a chemical sensor (not shown), such as a PH sensor or an electrostatic sensor, may be used to determine the presence of certain chemicals in media 12. Thus probe 82 can take many forms and shapes without limiting the generality of the foregoing, and cables 86 and 88 may be replaced by electrically conducting cables (not shown) to suit the purposes of the measurement being carried out.

An exit probe 84 is attached to the exit end of separation tube 30 to measure the concentration of each component of fluid media 12. Similarly sensory signals from intake probe 82 are sent to the analyzer 90 to determine the efficiency of the separation process. Analyzer 90 is then used to calculate the efficiency of the separation so that a feed back signal can be generated by analyzer 90 to modulate the separation process. If analyzer 90 determines that the concentration of the component media 16 in fluid media 12 is higher than a pre-set maximum, analyzer 90 sends a signal to the separator 40 motor to increase or decrease the speed of the rotation means 40 as appropriate. This way, the efficiency of rotation means 40 can be maintained with the maximum possible energy efficiency. System 10 can then be used to separate media 12 comprising a variety of different component 16 densities without limiting optimum system 10 efficiency. For example, if the separation speed required is slower than what was required for a previous separation, then system 10 automatically finds its optimum speed of separation without substantial loss of media 12.

The Bleeder Means

A bleeder means 70 is also preferably provided, as illustrated in FIGS. 3, 4, 5 and 6. These FIGURES show an embodiment of system 10 which is configured primarily to separate and concentrate a contaminant component medium 16 in a main fluid media which is required to be recovered completely from the main body of fluid media 12. For example, media 12 could be water, and the lighter component medium 16 to be separated could be oil. In this instance, the objective is to separate the oil, and to extract the oil together with the minimum amount of water possible through the axial extraction conduit 60.

Figure 4:
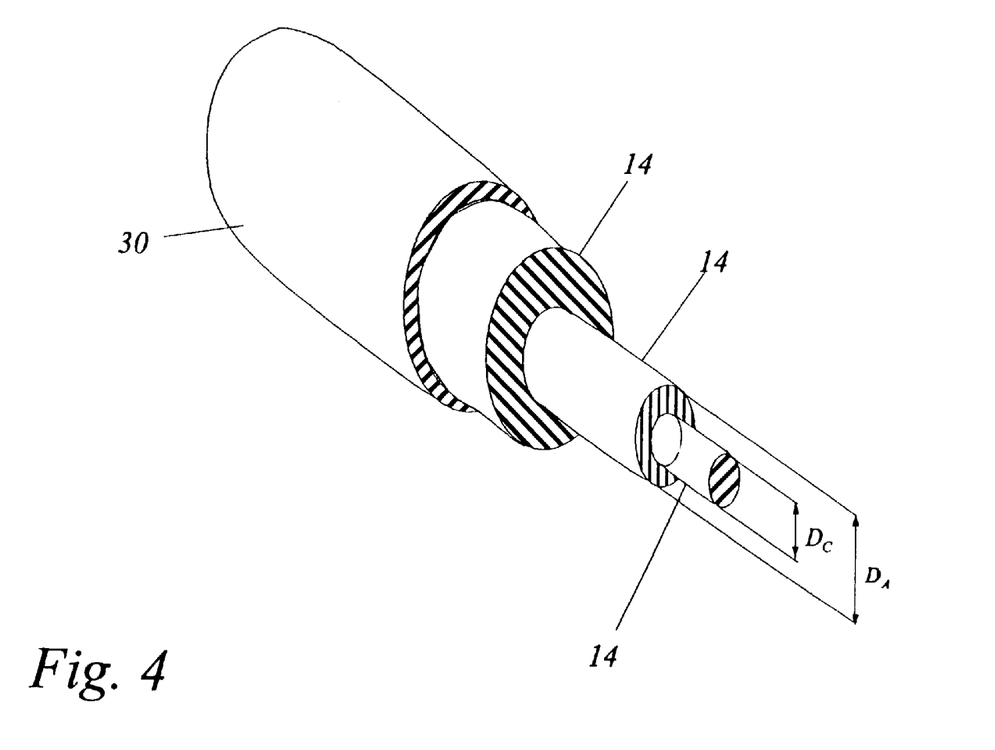
FIG. 4 is a perspective, illustrative view of the radial layers of the component medium fluids after separation.

To achieve this objective, bleeder means 70 including a bleed valve 72 is placed into fluid communication with the inlet segment of separation tube 30. As indicated above, intake probe 82 measures the concentration of each component fluid medium 16 as media 12 enters separation tube 30. If analyzer 90 receives a signal from probe 82 indicating a concentration of component medium 16 above a preset threshold, a signal is sent in turn by analyzer 90 to bleed valve 72 to open in proportion to the concentration of fluid medium 16 in media 12 and cause a gas 74 to enter the media 12 stream before separation. The gas 74 forms an axial layer within media 12 which increases the outer diameters of the media 12 layers. The layer immediately surrounding the central column of gas 74 is typically the oil requiring extraction, and the diameter of the oil layer 14 is made to approach and more closely approximate the inner diameter of axial extraction conduit 60. As a result, only a minimal amount of the water and other component media 16 surrounding the oil layer 14 are able to enter extraction conduit 60, and the oil and gas 74 are extracted almost exclusively. FIG. 4 schematically illustrates the separation of the flowing media 12 into its component media 16 and a gas 74 column altering the diameters of the layers 14. The axial column of gas 74 is the lightest component medium 16, and the layers surrounding gas 74 are progressively heavier as they approach the separation tube 30 wall. It is noted once again that the separation of an oil and water media 12 is only an example, and other flowable media can be separated with system 10 in the very same way.

Figure 5:
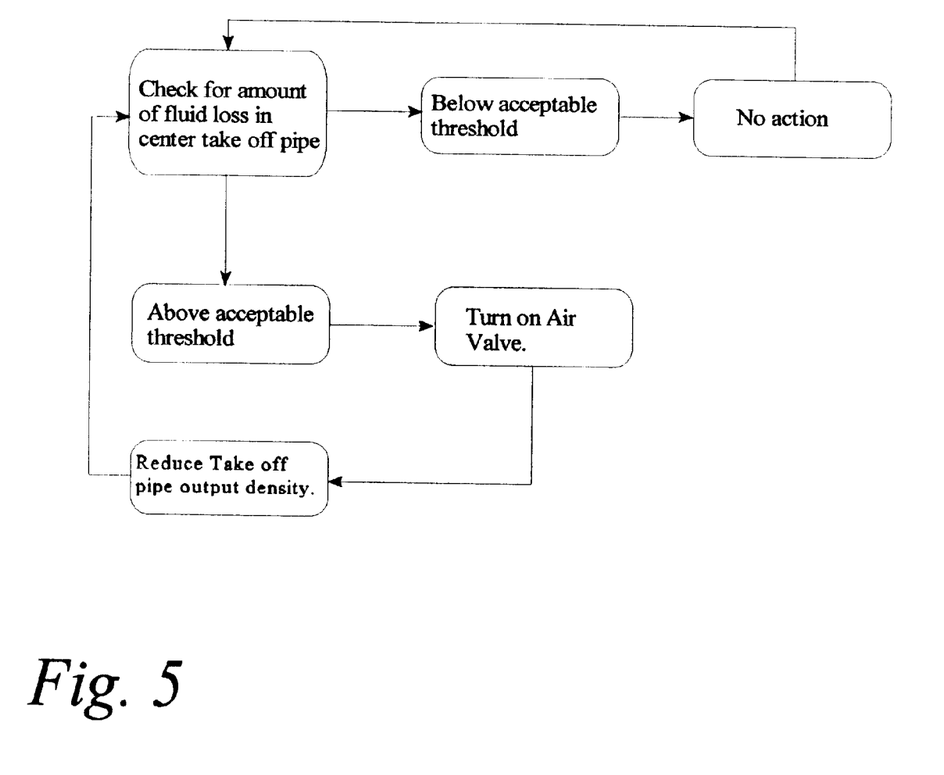
FIG. 5 is a schematic flow diagram of the system showing how the air valve is controlled to vary the density of the lighter fluids or component media entering the extraction conduit.

The most convenient and economical gas 74 to introduce through bleed valve 72 would often be air from the atmosphere. Yet other sources and types of gas 74 may be substituted depending on the media 12 to be separated. Gas 74 might alternatively be a reagent, for example, which reacts with the central media 12 stream to increase or decrease its density, or to coagulate and emulsify the stream, for optimum manipulation of media 12 as needed. A number of advantages may be gained by delivering a reagent into the media 12 stream, such as where the streams of fluid media 12 are nuclear wastes requiring recovery. In this instance, a solidifying agent may be added to the media 12 stream for interacting with the various component media 12 to be separated. FIG. 5 shows the above-described and logical sequence of events in the media 12 separation.

A reagent may modify the density of the component medium 16 to be separated. By reducing the density of the media 12 stream, the radius of rotation of the selected component medium 16 is increased until it equals the entry radius of the axial extraction conduit 60. This minimizes the amount of medium 16 in media 12 and achieves the desired goal of minimizing cross-contamination of the several component media 16.

Notwithstanding the generality of the foregoing, the bleed valve 72 can also be used to inject a liquid reagent which for example will react with a soluble component of the media 12, which cannot be separated by physical means. Thus for example a selective chemical agent could be injected by bleed valve 72 to induce the precipitation of a selected chemical in the component medium 16 to be separated. Once separated, the chemical will be centrifuged and separated from the medium 16.

Figure 6:
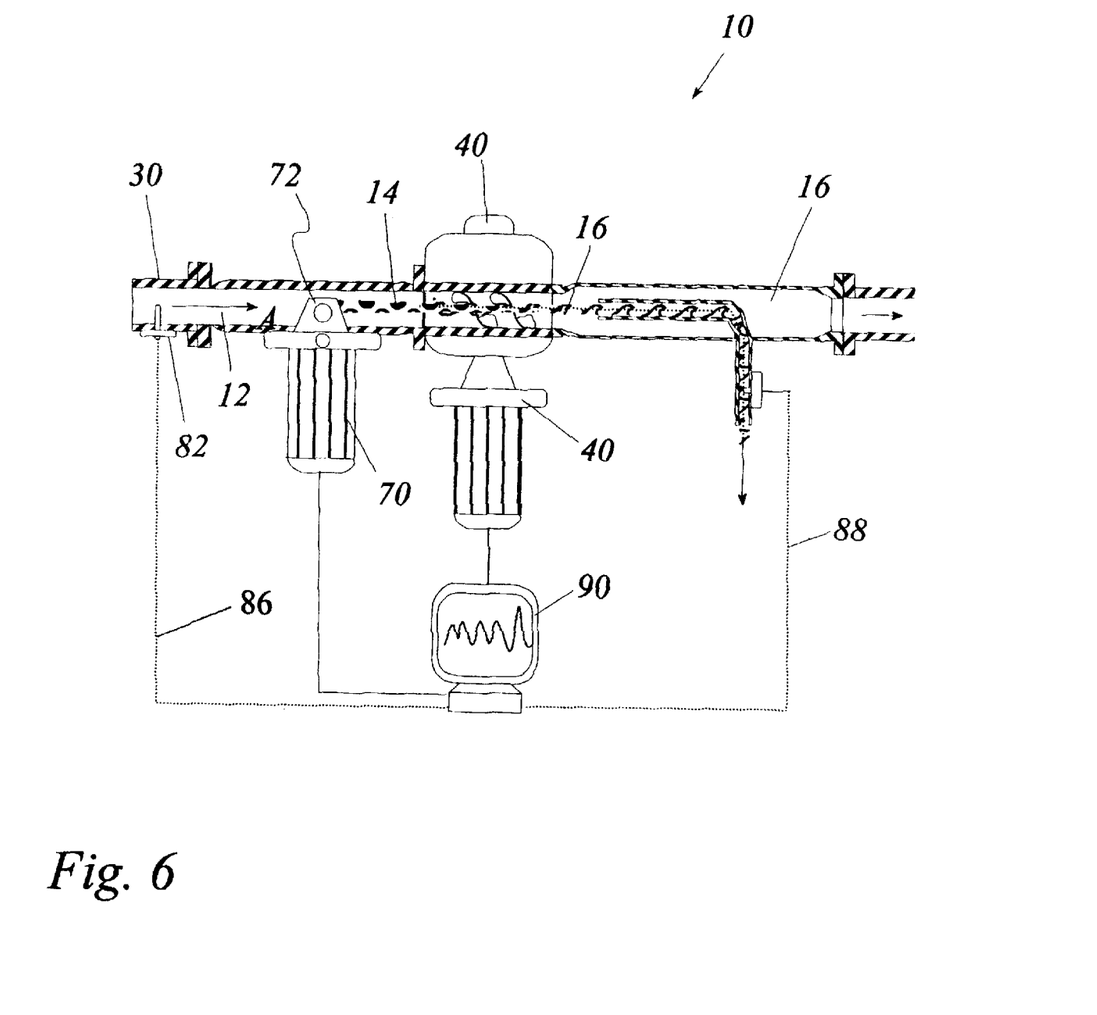
FIG. 6 is a view of the system as in FIG. 3, with a demulsifying agent injected into the flow stream to demulsify the medium prior to separation.

FIG. 6 shows a demulsifying agent being injected into the flow media 12, and the flow media 12 being chemically separated prior to the mechanical separation. Before entering the rotation means 40, the component medium 16 to be separated is passed through bleed valve 72, which could be controlled by analyzer 90 to add a reagent such as an emulsifier or a demulsifier into the medium 16. For example, the fluid medium 16 could comprise a combination of waste oil products such as vehicle engine oil, mixed with cleaning agents, metallic engine emissions, water and other chemicals. In such a case, a reagent would be applied to demulsify the oil product so that the particular component medium 16 to be recovered by the system 10 is expelled from the oil product prior to separation, and thus separated from the remaining chemical component media 16.

Figure 7:
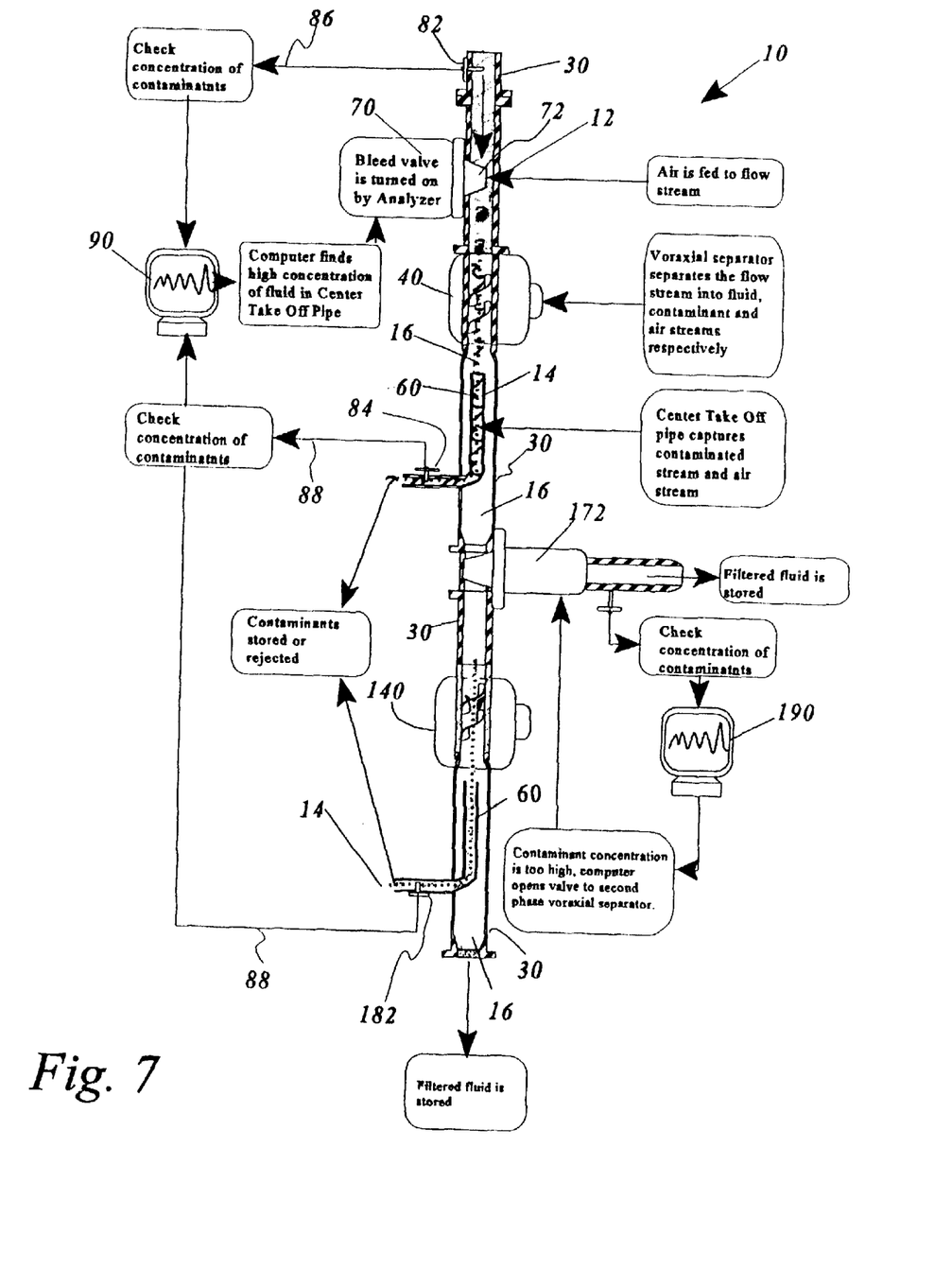
FIG. 7 is a diagram showing the complete separator and control system, with a secondary phase separator and a flow control system installed to increase the efficiency of the separation.

Referring to FIG. 7, a system 10 is shown with all the control features illustrated above. In addition to the elements of system 10, FIG. 4 illustrates a stage by stage sequence of events with a block diagram. The medium 16 to be separated enters the separation tube 30 and is processed and separated according to the embodiments described earlier, except that the additional control feature of bleed valve 72 is incorporated. However, an additional valve member 172 is shown at the exit point of the media 12 from the rotation means 40. Valve 172 is controlled by a second analyzer 190 which can also be incorporated into analyzer 90 if so desired. Probe member 182 is an additional probe that determines the concentration of component media 16 in exiting media 12. If media 12 is desired to be separated from the trace amounts of media 16 valve member 172 is opened by analyzer 190 to allow media 12 to flow into a second rotation means 140. Analyzer 190 measures the concentration of the component medium 16 in media 12 from the readings of probe member 182. If the concentration is above a certain threshold, analyzer 190 opens valve member 172 to divert the flow from separation tube 30 to pass through the second phase rotation means 140. The exiting media 12 from rotation means 140 is then substantially free from any significant traces of component medium 16.

Thus the rotation means 40 and 140 can be placed in a series of configurations that allow a multi-phase separation of component media 16. For example, if several component media 16 of different densities are present in the media 12 that enters first rotation means 40, then multiple rotation means 40 and 140, and so on, separators can remove each component medium 16 with greater efficiency than a singular rotation means.

The Extraction Port Adjustment Mechanism

Figure 8:
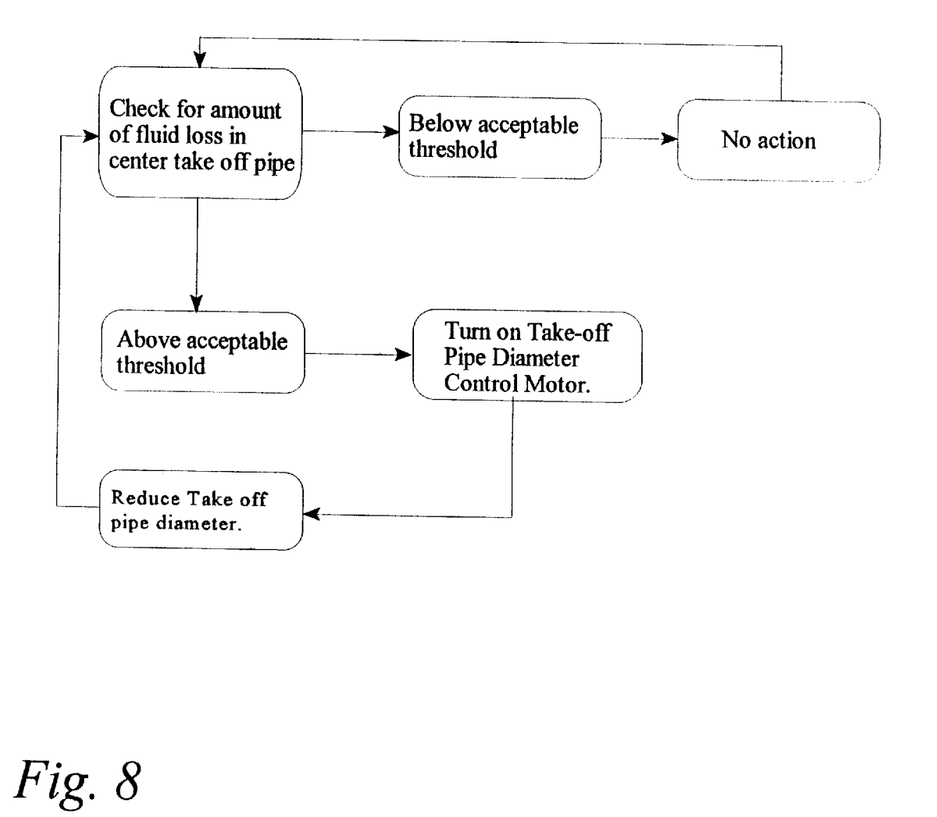
FIG. 8 is a schematic flow diagram of the system showing how the diameter of the extraction conduit can be varied to control the efficiency of the apparatus.

FIG. 8 is a flow diagram of system 10 monitoring and controlling the inner diameter of extraction conduit 60, so that the efficiency of the system 10 is maximized. As is evident from FIG. 8, probes 82 and 84 provide information concerning the concentration of chemicals in the extraction conduit 60. This data is in turn used to determine the optimum diameter of the extraction conduit 60. The extraction conduit 60 diameter can be then varied by a control motor (not shown) which receives the appropriate commands from analyzer 90. The design of extraction conduit 60 can be optimized to eliminate any disturbances of the flow into extraction conduit 60. For example, extraction conduit 60 can be designed with an iris end which is tapered to accept the flow at an annular entrance whose diameter can be mechanically varied in real time by a motor (not shown) controlled by analyzer 90. Thus it is seen that the present invention provides an effective method of separation of fluid media 12 by means of a separation tube 30 with media 12 rotation means 40 and a feed back control system 80.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

PARTS LIST

10. System
12. Composite media
14. Radial layers
16. Component medium
30. Separation tube
40. Rotation means (and 140. Second rotation means)
42. Rotation blades
60. Extraction conduit means
70. Bleeder means
72. Bleed valve (and 172. Second bleed valve)
74. Gas
80. Port adjustment mechanism
82 Intake probe (and 182. Third probe member)
84. Exit probe
86. Optic cable
88. Optic cable
90. Analyzer (and 190. Second analyzer)

I claim as my invention:

1. A system for separating flowable composite media into its components, comprising:

pump means delivering a flowing stream of the composite media, made up of at least a first component medium and a second component medium, a separation tube through which the stream of the flowable composite media is passed, means for spinning the stream of flowable composite media about the axis of said separation tube at sufficient rotational speed that centrifugal force within the stream causes the components to separate into component radial layers, according to their specific gravities, extraction conduit means for selectively extracting one or more of the radial layers from said separation tube, and monitoring and automatic feed back means for measuring the component medium content of the composite media as the composite media enters and exits said separation tube and for adjusting the rotational speed of the media, wherein said monitoring and automatic feed back means comprises probe means extending into said media for gathering data concerning the content of said composite media, and an analyzer connected to said probe means for receiving and analyzing said data and for automatically controlling the rotational speed imparted to said composite media by said rotation means.

2. A system according to claim 1, additionally comprising:

bleeder means for introducing a fluid into said separation tube to alter the diameter of the component radial layers, wherein said media monitoring and automatic feed back means additionally adjusts the rate of fluid introduction from said bleeder means.

3. A system according to claim 1, wherein said extraction conduit means has an inner diameter, additionally comprising:

extraction port adjustment means for altering the inner diameter of said extraction conduit means.

4. A system according to claim 1, wherein said separation tube has an inlet end and exit end, wherein said probe means comprises a first probe at said tube inlet end and a second probe at said tube outlet end.

5. A system according to claim 4, wherein said probes comprise a spectrometer for measuring the spectral response of said composite media.

6. A system according to claim 1, wherein said analyzer comprises computer means.

7. A system for separating flowable composite media made up of at least a first component medium and a second component medium into its components, comprising:

pump means delivering a flowing stream of said composite media, a separation tube through which the steam of composite media is passed, means for spinning the stream of flowable media about the axis of said separation tube at sufficient rotational speed that centrifugal force within the stream causes the component media to separate into component radial layers, according to their specific gravities, extraction conduit means for selectively extracting one or more of the radial layers from said separation tube, bleeder means for introducing a fluid into the tube to alter the diameter of the component radial layers, and composite media monitoring and automatic feed back means for measuring the component content of the composite media as the composite media enters and exits said separation tube and for adjusting the rotational speed of the media and the rate of fluid introduction from said bleeder means.

8. A system according to claim 7, wherein said bleeder means comprises a bleed valve.

* * * * *